United States Patent
Bucknell (10) Patent No.: US 11,022,375 B2
(45) Date of Patent: Jun. 1, 2021

(54) APPARATUS AND METHODS FOR ADDITIVELY MANUFACTURING MICROTUBE HEAT EXCHANGERS

(71) Applicant: DIVERGENT TECHNOLOGIES, INC., Los Angeles, CA (US)

(72) Inventor: John Russell Bucknell, El Segundo, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 81 days.

(21) Appl. No.: 15/643,405

(22) Filed: Jul. 6, 2017

(65) Prior Publication Data
US 2019/0011187 A1 Jan. 10, 2019

(51) Int. Cl.
*F28F 1/10* (2006.01)
*F28D 7/00* (2006.01)
(Continued)

(52) U.S. Cl.
CPC ........... *F28D 7/0066* (2013.01); *B21D 53/06* (2013.01); *B23K 26/342* (2015.10); *B23P 15/26* (2013.01);
(Continued)

(58) Field of Classification Search
CPC .. F28D 1/05366; F28D 7/1653; F28D 7/0066; B33Y 10/00; B33Y 50/02;
(Continued)

(56) References Cited

U.S. PATENT DOCUMENTS 4,676,305 A * 6/1987 Doty ..................... F28D 7/1653
165/158
4,928,755 A 5/1990 Doty et al.
(Continued)

FOREIGN PATENT DOCUMENTS

CN 1158408 A 9/1997
CN 204830955 U 12/2015
(Continued)

OTHER PUBLICATIONS

US 9,202,136 B2, 12/2015, Schmidt et al. (withdrawn)
(Continued)

*Primary Examiner* — Davis D Hwu
(74) *Attorney, Agent, or Firm* — Arent Fox LLP (57) ABSTRACT

Apparatus and methods for additively manufacturing microtube heat exchangers are disclosed herein. A heat exchanger header is additively manufactured with high density microtube arrays to achieve an integrated structure achieving values of heat transfer effectiveness $E_{ff}$ up to ninety percent and values of transfer surface area densities up to 20,000 $m^2/m^3$. The heat exchanger header can be printed with a high density microtube array to separate different types of fluids or liquids into different microtubes and to form a high quality seal. Additionally, microtubes and/or microtube arrays can be additively manufactured to be curved or to have pleats; and microtube lattice arrays can be compactly positioned within hollow support structures.

33 Claims, 8 Drawing Sheets

(51) Int. Cl.
*B23P 15/26* (2006.01)
*B21D 53/06* (2006.01)
*F28F 9/02* (2006.01)
*B33Y 50/02* (2015.01)
*B33Y 80/00* (2015.01)
*B33Y 10/00* (2015.01)
*B23K 26/342* (2014.01)
*F28F 1/16* (2006.01)
*F28F 1/02* (2006.01)
*F28D 1/053* (2006.01)
*B23K 101/14* (2006.01)

(52) U.S. Cl.
CPC .............. *B33Y 10/00* (2014.12); *B33Y 50/02* (2014.12); *B33Y 80/00* (2014.12); *F28D 1/05333* (2013.01); *F28F 1/022* (2013.01); *F28F 1/16* (2013.01); *F28F 9/02* (2013.01); *B23K 2101/14* (2018.08); *F28F 2255/18* (2013.01)

(58) Field of Classification Search
CPC .. B33Y 80/10; B23K 26/342; B23K 2101/14; B21D 53/06; B23P 15/26; F28F 9/02; F28C 3/04
USPC ........................................................ 165/172
See application file for complete search history.

(56) References Cited

U.S. PATENT DOCUMENTS

| | | |
|---|---|---|
| 5,203,226 A | 4/1993 | Hongou et al. |
| 5,690,166 A | 11/1997 | Yamaguchi |
| 5,742,385 A | 4/1998 | Champa |
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,359,744 B2 | 1/2013 | Drabe et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |

(56) References Cited

U.S. PATENT DOCUMENTS

| | | |
|---|---|---|
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,077,944 B2 | 9/2018 | Hislop |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |

(56) References Cited

U.S. PATENT DOCUMENTS

| | | | |
|---|---|---|---|
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2008/0210413 A1 | 9/2008 | Hislop |
| 2010/0300666 A1 | 12/2010 | Hislop et al. |
| 2013/0233526 A1 | 9/2013 | Hislop |
| 2014/0251585 A1 | 9/2014 | Kusuda et al. |
| 2014/0277669 A1 | 9/2014 | Nardi et al. |
| 2015/0241131 A1* | 8/2015 | Katoh ............... F28D 1/05366 |
| | | 165/140 |
| 2016/0282061 A1* | 9/2016 | Veilleux, Jr. ............ B23P 15/26 |
| 2017/0045313 A1* | 2/2017 | Fennessy ............... B33Y 10/00 |
| 2017/0113344 A1 | 4/2017 | Schönberg |
| 2017/0341309 A1 | 11/2017 | Piepenbrock et al. |
| 2018/0245853 A1* | 8/2018 | Sennoun ................ F28C 3/04 |

FOREIGN PATENT DOCUMENTS

| | | |
|---|---|---|
| CN | 105750545 A | 7/2016 |
| CN | 208920904 U | 5/2019 |
| EP | 2977701 A1 | 1/2016 |
| GB | 20160089 | 6/2016 |
| GB | 201706431 | 4/2017 |
| GB | 2559610 A | 8/2018 |
| JP | 2004353954 A | 12/2004 |
| KR | 1020150075037 A | 7/2015 |
| WO | 1996036455 A1 | 11/1996 |
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2013163398 A1 | 10/2013 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2018055325 A1 | 3/2018 |
| WO | 2018178619 A1 | 10/2018 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report & Written Opinion dated Oct. 25, 2018, regarding PCT/US2018/041028.
First Office Action dated Dec. 25, 2018, regarding China Application No. CN201821053501.6.
European Supplemental Search Report for Application No. 18827392.4, dated Feb. 3, 2021.
Chinese Office action for Patent Application No. 201810725759.4, dated Mar. 2, 2021, 8 pages.

\* cited by examiner

APPARATUS AND METHODS FOR ADDITIVELY MANUFACTURING MICROTUBE HEAT EXCHANGERS

BACKGROUND

Field

The present disclosure relates generally to compact heat exchangers, and more specifically to microtube heat exchangers manufactured using additive manufacturing techniques.

Background

Heat exchangers transfer heat between fluids. For instance, an automobile radiator operates to transfer heat from circulating radiator fluid to forced air, a gaseous fluid. The automobile radiator is an example of a compact heat exchanger, designed to realize a large transfer surface area per unit volume.

Recently three-dimensional (3D) printing, also referred to as additive manufacturing, has presented new opportunities to efficiently build material structures including, but not limited to, automobiles, airplanes, boats, motorcycles, and the like. Additive manufacturing avails different complex geometries not previously available in traditional manufacturing processes; also, conventional techniques for joining parts, such as welding, may not be viable alternatives for use with some of these new materials. Accordingly, there is a need to discover and develop new ways to assemble components, including heat exchangers, using additively manufactured parts and techniques.

Further, applying additive manufacturing processes to industries that build material structures has proven to produce structurally more efficient products and also help the environment. As compared to traditional manufacturing processes, 3D printing does not significantly contribute to the burning of fossil fuels; therefore, applying 3D printing to other components, including heat exchangers, is an environmentally worthwhile pursuit.

SUMMARY

Several aspects of additively manufacturing heat exchangers will be described more fully hereinafter with reference to three-dimensional (3D) printing techniques.

In one aspect a method for manufacturing a heat exchanger comprises receiving a data model of the heat exchanger and additively manufacturing the heat exchanger based on the data model. The modelled heat exchanger comprises a microtube array and at least one header. The header is coupled to and integrated with the microtube array at a base plate. The at least one header is for directing a fluid through a plurality of tubes of the microtube array to transfer heat between the fluid and a medium external to the plurality of tubes.

The step of additively manufacturing the heat exchanger can comprise forming a continuous solid body comprising the microtube array and the at least one header. Additionally, the step of additively manufacturing the heat exchanger can further comprise additively manufacturing the microtube array and the at least one header integrated with the microtube array in a single three-dimensional (3D) rendering step. Also, a diameter of each of the plurality of tubes can be equal to or less than two millimeters (mm).

The step of additively manufacturing the heat exchanger can comprise additively manufacturing a first surface of the at least one header, the first surface including a microtube array interface disposed substantially parallel to the base plate. The step of additively manufacturing the heat exchanger can comprise additively manufacturing a second surface of the at least one header, the second surface being coupled to, and angled relative to, the first surface; and the step of additively manufacturing the heat exchanger can comprise additively manufacturing a third surface of the at least one header, the third surface connecting the first surface and second surface so as to form a cross section. The fluid can be configured to flow through the at least one header in a direction substantially perpendicular to the cross section. The cross-section can be substantially triangular.

The step of additively manufacturing the heat exchanger can further comprise depositing a plurality of layers including support material on the base plate. The support material can form an angled support structure configured to provide support to the second surface of the at least one header. The second surface of the at least one header can be additively manufactured atop the angled support structure.

The step of additively manufacturing the heat exchanger can further comprise depositing a plurality of layers including support material on the base plate. The support material can form a support structure having a plurality of angles relative to the base plate. The support structure can be configured to provide support to the second and third surfaces of the at least one header. The second and third surfaces can be additively manufactured atop different angled portions of the support structure.

The step of additively manufacturing the heat exchanger can further comprise adding a lattice structure between at least two surfaces of the at least one header. The lattice structure can be configured to provide structural support for the at least one header.

The step of additively manufacturing the heat exchanger can further comprise adding a lattice structure between the second and first surfaces of the at least one header. The lattice structure can be configured to provide structural support for the at least one header.

The step of additively manufacturing the heat exchanger can comprise forming a microtube array arranged in a curved or pleated pattern relative to a direction of incoming air flow. The step of additively manufacturing the heat exchanger can comprise forming a microtube array comprising a pleated arrangement of microtubes. Also, the step of additively manufacturing the heat exchanger can comprise forming fins between microtubes in one or more columns of microtubes. Each fin can connect a microtube to an adjacent microtube in each of the one or more columns.

The method for manufacturing the heat exchanger can further comprise additively manufacturing the heat exchanger at an angle relative to the base plate and adding to each microtube at least one fin connecting the microtube to another microtube. The fin can extend from the base plate to the top of the microtubes to which it is connected.

In another aspect an additively manufactured heat exchanger comprises a microtube array and a header. The microtube array comprises a plurality of microtubes forming a substantially parallel array extending from a base plate. The plurality of microtubes comprises a first plurality of microtubes and a second plurality of microtubes. The header comprises a plurality of header sections. The plurality of header sections comprises a first header section and a second header section. The first header section is integrated with the first plurality of microtubes at the base plate; and the second header section is integrated with the second plurality of microtubes at the base plate. The first header section is configured to direct a first fluid through the first plurality of microtubes so as to exchange heat with an external fluid; and the second header section is configured to direct a second fluid through the second plurality of microtubes so as to exchange heat with the external fluid.

The microtube array can have a non-planar configuration relative to a plane normal to the base plate. The external fluid can comprise a gas. The microtube array, the base plate, and the header collectively can form a solid and continuous body. A diameter of each of the plurality of microtubes can be equal to or less than two millimeters (mm). The external fluid can flow substantially orthogonal to a flow direction of the first and second fluids.

At least one of the plurality of microtubes can be curved. At least one of the plurality of microtubes can be pleated.

The header can comprise a top surface at the base plate or a section thereof, and at least one surface coupled longitudinally to the top surface at an angle relative to the top surface. Also, the header can comprise a channel having a cross-sectional surface. The cross-sectional surface can be substantially triangular. The channel can be substantially orthogonal to the microtube array.

The header can comprise a first surface, a second surface, and a third surface The first surface can be substantially parallel to the base plate. The second surface can be coupled longitudinally to the first surface at a first angle; and the third surface can be coupled longitudinally to the second surface at a second angle. The first, second, and third surfaces can define the channel.

The microtube array can have a non-planar configuration relative to a plane normal to the first fluid flow. The microtube array can comprise a curved configuration. Also, the microtube array can comprise a pleated configuration.

The heat exchanger can further comprise a fin disposed between each adjacent microtube in at least one column of microtubes. The fin can be disposed from the base plate to a surface of the connected microtubes, and the fin can be configured to provide structural support to the column of microtubes.

The heat exchanger can further comprise a fin disposed between each adjacent microtube in at least one row of microtubes in the array.

The heat exchanger can be additively manufactured at an angle relative to the base plate; and each of the plurality of microtubes can include at least one fin connected to an adjacent microtube. The at least one fin can be configured to provide the microtube array with structural support.

In another aspect an additively manufactured compact heat exchanger comprises a base plate, a first plurality of microtubes, and a first header section. The first plurality of microtubes form an array. The first plurality of microtubes are substantially parallel, and they extend from the base plate. The first header section is integrated with the first plurality of microtubes at the base plate and configured to direct a first fluid through the first plurality of microtubes so as to exchange heat with an external fluid.

The additively manufactured compact heat exchanger can further comprise a second plurality of microtubes and a second header section. The second plurality of microtubes can form an array. The second plurality of microtubes can be substantially parallel, and the second plurality of microtubes can extend from the base plate. The second header section can be integrated with the second plurality of microtubes at the base plate and configured to direct a second fluid through the second plurality of microtubes so as to exchange heat with the external fluid.

At least one of the first plurality of microtubes can be curved. At least one of the first plurality of microtubes can be pleated; and the external fluid can comprise a gas.

In another aspect a transport vehicle comprises an additively manufactured (AM) support structure. The AM support structure comprises an AM microtube lattice array; the AM microtube lattice array is configured to transfer heat between a first fluid and a second fluid.

The microtube lattice array can comprise a plurality of microtubes and a plurality of interstitial paths. The microtubes can be configured to carry the first fluid, and the interstitial paths can be configured to carry the second fluid. Heat can be transferred from the first fluid to the second fluid; also, heat can be transferred from the second fluid to the first fluid. The first fluid can be a liquid, and the liquid can be engine oil. The second fluid can be engine coolant. Also, the second fluid can be a gas, and the gas can be forced air.

In another aspect a method of manufacturing a heat exchanger comprises additively manufacturing a hollow support structure and additively manufacturing a microtube lattice array within the hollow support structure.

Different complex geometries and different microtube shapes may be used that were not previously available in traditional manufacturing processes. It will be understood that other aspects of additively manufacturing heat exchangers will become readily apparent to those skilled in the art from the following detailed description, wherein it is shown and described in only several embodiments by way of illustration. As will be appreciated by those skilled in the art, the additive manufacturing of heat exchangers using 3D printed components can be realized with other embodiments without departing from the invention. Accordingly, the drawings and detailed description are to be regarded as illustrative in nature and not as restrictive.

BRIEF DESCRIPTION OF THE DRAWINGS

Various aspects of apparatus and methods for additively manufactured heat exchangers will now be presented in the detailed description by way of example, and not by way of limitation, in the accompanying drawings, wherein.

DETAILED DESCRIPTION

The detailed description set forth below in connection with the drawings is intended to provide a description of exemplary embodiments of manufacturing heat exchangers using additively manufacturing techniques, and it is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

A heat exchanger's purpose is to exchange heat between fluids. A fluid can include liquids or gases, such as air. For instance, when one fluid is a gas and another fluid is a liquid, the heat exchanger can be referred to as a gas-to-liquid heat exchanger.

More generally, heat exchangers can be classified according to a variety of attributes including, but not limited to, the fluid type, the number of fluids, the direction or configuration of fluid flow, physical construction, and surface compactness. For instance, one construction classification or type of a heat exchanger is a shell-and-tube heat exchanger. Shell-and-tube heat exchangers contain a large number of tubes arranged inside a shell. The axes of the tubes are arranged parallel to that of the shell, and heat transfer takes place as one fluid flows inside the tubes while the other fluid flows outside the tubes within the shell. However, despite their use in numerous industrial applications, shell-and-tube heat exchangers can be poorly suited for transport vehicles, such as automobiles or aircraft, because shell-and-tube heat exchangers typically have a large size and weight.

A type or classification of heat exchanger better suited for applications such as transport vehicles is the compact heat exchanger. The compact heat exchanger is designed to realize a large transfer surface area per unit volume, sometimes referred to as transfer area density or surface area density. For instance, a gas-to-liquid heat exchanger is referred to as a compact heat exchanger when it has a heat transfer surface having a surface area density above about 700 meters squared per meters cubed ($m^2/m^3$). A liquid-to-liquid fluid heat exchanger can sometimes be referred to as a compact heat exchanger if its surface area density on any one fluid side is above about 400 $m^2/m^3$. By comparison, a typical shell-and-tube exchanger may only have a transfer surface area density of less than 100 $m^2/m^3$ on one fluid side. And the human lungs, another form of gas-to-liquid heat exchanger, provide the supreme transfer surface area density of about 20,000 $m^2/m^3$.

In addition to surface area density, compact heat exchangers can also be characterized by heat transfer effectiveness $E_{ff}$. Heat transfer effectiveness $E_{ff}$ is a dimensionless figure of merit which can be expressed in terms of fluid temperature ratios.

Traditional compact heat exchangers are generally made of sheet metal construction, with fluid pipes and headers bonded and sealed to each other via adhesive or brazing. For heat exchange with low thermal capacity fluids, generally the heat exchange rate can be limited by the surface area exposed to that fluid so additional fins are added to conduct heat to the higher heat capacity fluid. Metal construction of compact heat exchangers is generally favored due to metal's high strength and thermal conductivity, allowing thinner wall sections, lower mass, and reduced cost. Compact heat exchangers can also use microtubes for improving performance. Microtubes are smaller and have smaller diameters than traditional tubes. For instance, a typical tube may have a diameter of greater than 0.5 inches while a microtube may have a diameter of 0.1 inches or less. Microtubes can advantageously hold very high pressures, be robust to damage, and provide a higher surface area density compared to traditional tubes.

Another construction type of compact heat exchanger is a printed circuit heat exchanger (PCHE). A PCHE can be constructed using a solid state process known as diffusion bonding. Due to manufacturing constraints, both the PCHE and traditional compact heat exchangers have only achieved transfer surface area densities of about one tenth the supreme value of 20,000 $m^2/m^3$ with heat transfer effectiveness $E_{ff}$ values of less than ninety percent. Accordingly, there is a need to design high performance compact heat exchangers capable of achieving higher values of transfer surface area density and higher values of heat transfer effectiveness $E_{ff}$.

Apparatus and methods for additively manufacturing microtube heat exchangers are disclosed herein. A heat exchanger header is additively manufactured with high density microtube arrays to achieve an integrated structure having values of heat transfer effectiveness $E_{ff}$ up to ninety percent and values of transfer surface area densities up to 20,000 $m^2/m^3$. The heat exchanger header can be printed with the high density microtube array to separate different types of fluids or liquids into different microtubes and to form a high quality seal. Additionally, microtubes and/or microtube arrays can be curved or pleated; and microtube lattice arrays can be compactly positioned within hollow support structures.

Figure 1:
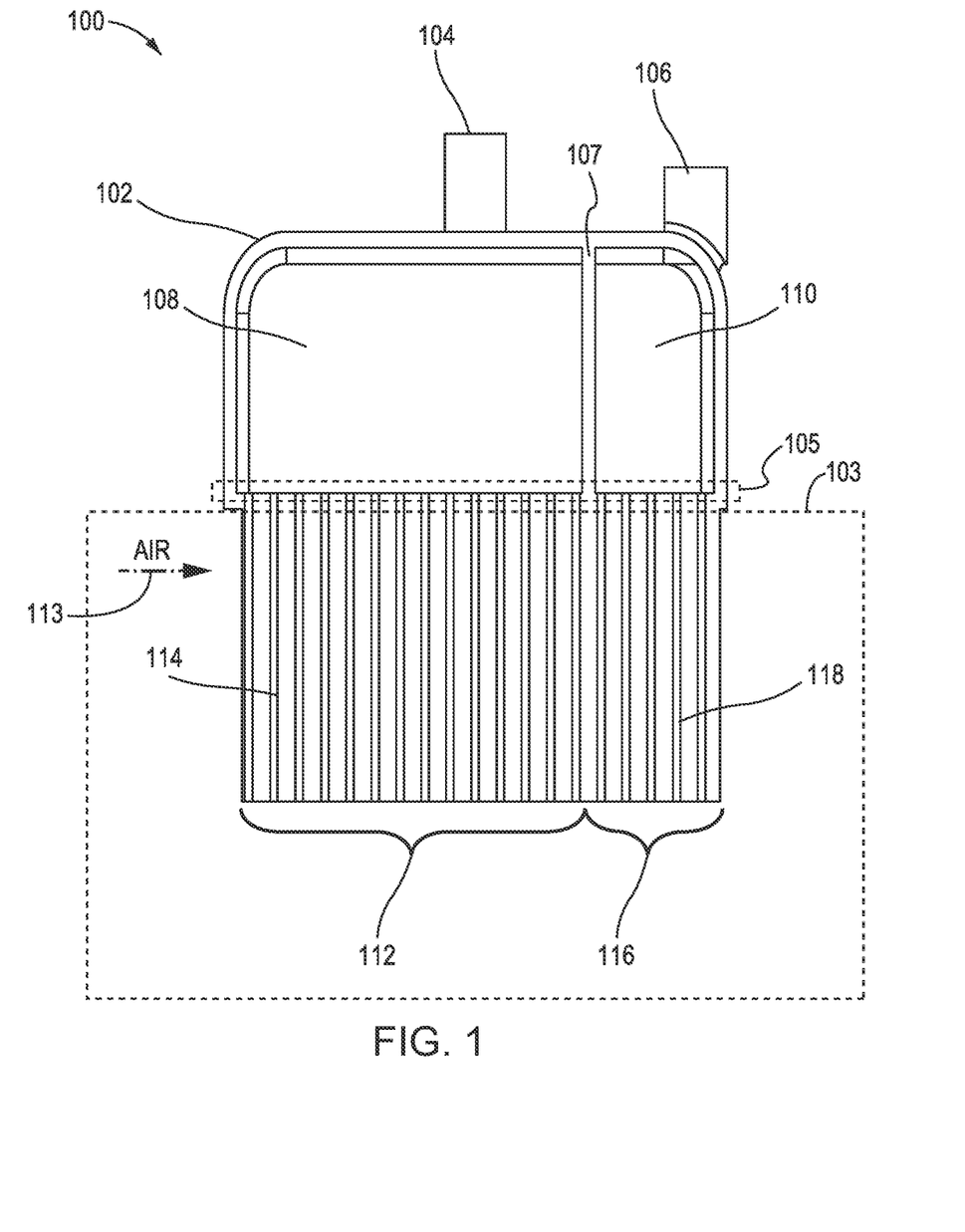
FIG. 1 illustrates a side view of an additively manufactured microtube heat exchanger according to an embodiment.

FIG. 1 illustrates a side view of an additively manufactured (AM) microtube heat exchanger 100 according to an embodiment. The AM microtube heat exchanger 100 includes a header 102 and a microtube array 103 integrated at an interface 105. The header 102 has a header section 108 and a header section 110. The header section 108 has an inlet/outlet port 104, and the header section 108 has an inlet/outlet port 106. A dividing wall or divider 107 can separate the header section 108 from the header section 110 to separate a fluid of the header section 108 from a fluid of the header section 110.

Unlike conventional processes which use sheet metal construction metallic braze tubes to sheet and affix headers, additively manufacturing the header 102 with the divider 107 allows for fluid-tight division between the header sections 108 and 110. Advantageously, this can allow dissimilar fluids to flow in the header sections 108 and 110. Structures allowing fluids to be closely brought together in the same structure can have reduced mass, and hence realize improved heat transfer effectiveness $E_{ff}$.

The microtube array 103 has a plurality of microtubes separated into a first microtube array 112 and a second microtube array 116. Microtubes from the first microtube array 112 can carry a first liquid or fluid, and microtubes from the second microtube array 116 can carry a second liquid or fluid. For instance, microtubes including microtube 114 can carry a liquid such as oil, and microtubes including microtube 118 can carry a liquid such as a water-based coolant, although numerous other fluids are possible depending on the application.

As described herein, an AM microtube heat exchanger can be used to manufacture the header 102 so that it is integrated with the microtube array 103. This can be accomplished without traditional brazing techniques, and the header 102 can be configured as a fluid distribution manifold for fluids.

The AM microtube heat exchanger can cool the fluids flowing within the microtubes of microtube array 102 by exchanging heat to air flowing perpendicular, or substantially perpendicular, to the microtubes. For instance, as shown in FIG. 1, air flow can be forced to flow via the inlet/outlet ports 106 and 108 in the direction indicated by air flow vector 113. Alternatively, the direction of air flow can be opposite that of the air flow vector 113. In this way the hot and cold fluids are separated (not mixed) in a cross-flow configuration.

Although the AM microtube heat exchanger 100 shows a header having two header sections 108, 110 and first and second microtube arrays 112, 116, other configurations are possible. For instance, an AM microtube heat exchanger can be manufactured with a header having greater or fewer than two header sections; and more or fewer microtube arrays can be separated for carrying different types of liquids. Also, by using a 3D manufacturing process, the header 102 can have internal chambers (not shown) with any desirable high performance shape. For instance, the header 102 can be formed in the shape of a triangle or to have triangular features.

The header 102 can be additively manufactured from a base plate (not shown) at the interface 105. In this way the header 102 can be additively manufactured with the microtube array 103 to be continuous.

Figure 2:
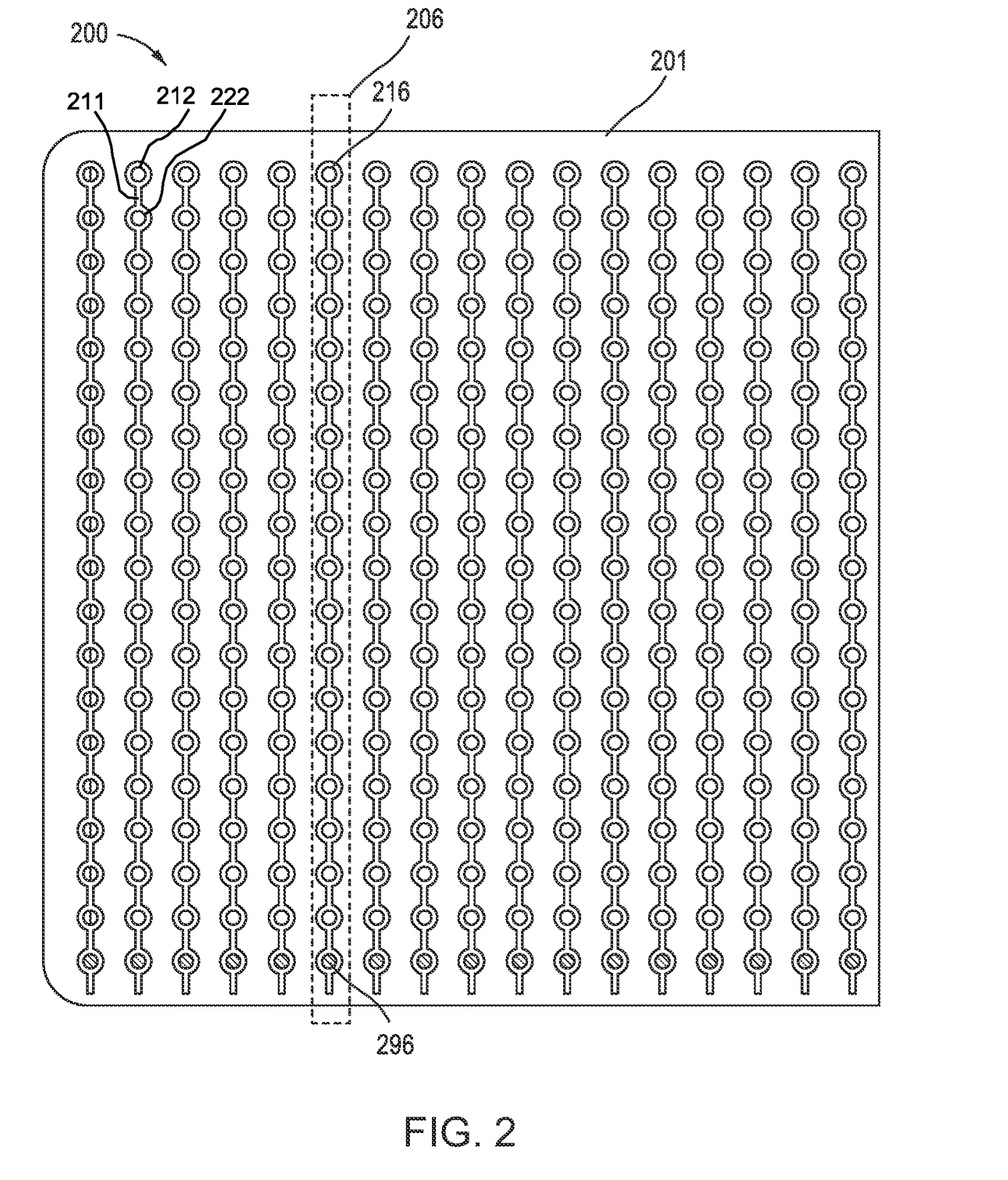
FIG. 2 illustrates a cross-sectional view of a microtube array according to an embodiment.

FIG. 2 illustrates a cross-sectional view of a microtube array 200 according to an embodiment. Microtubes can be arranged in rows and columns including column 206. As shown in FIG. 2, a microtube cross section 216 is located in the first row and sixth column and a microtube cross section 296 is located in the ninth row and sixth column. Additionally, fins can be formed between microtubes. For instance, as illustrated in FIG. 2, a fin 211 is formed between microtube cross sections 212 and 222. In an exemplary embodiment, the fins 211 may extend from the base plate up to a surface of the microtubes 216. The fins 211 may be used to transfer thermal energy more efficiently through the microtube array. The fins 211 may also be used to provide structural support for the microtubes 216 during the AM process. In certain embodiments, the fins 211 may be disposed diagonally between microtubes 216 in addition to or in lieu of the straight line configuration shown in column 6. This alternative embodiment provides additional support for the microtube array in more complex 3-D printing arrangements, including where the heat exchanger is oriented at an angle relative to the build plate while being printed.

Microtubes can be arranged as a planar web connecting a separation distance between tubes arranged parallel to the flow path of liquids flowing inside. This can advantageously allow support material to connect to a row, referred to as a datum row, to provide support during the additive manufacturing process.

In some embodiments microtubes can be manufactured so that the microtube or tube axis is substantially parallel to the force due to gravity; in other embodiments microtubes can be manufactured so that a microtube or tube axis is substantially normal to the force due to gravity. When manufactured with a tube axis normal to the gravitational force, microtubes can be arranged so that they are secured or tied back to a datum (single supporting) row. When manufactured with a tube axis parallel to the gravitational force, microtubes can be free-standing.

In other embodiments rows and columns can be positioned using simple linear vectors allowing for a simplified analysis and design procedure. Configurations of rows and columns that provide an integral support structure can also be lighter than those that need additional material when constructed largely normal to the gravity vector. Also, hollow beam elements can be fluid passages, and appropriately designed unit cells can propagate and transport fluid across spans.

Advantageously, additively manufacturing a header, such as the header 102 of FIG. 1, can allow for the header to be a continuous part of the microtube array 200. This can allow for improved fluid flow and improved sealing with the microtubes. For instance, unlike traditional brazing techniques to join headers with microtubes, an AM header-to-microtube seal can be uniform with less leakage. An AM process can be accomplished with a single-step process such as selective laser melting. This in turn can lead to lower tube blockage, lower tube fouling, and overall improved heat exchanger performance.

Figure 3:
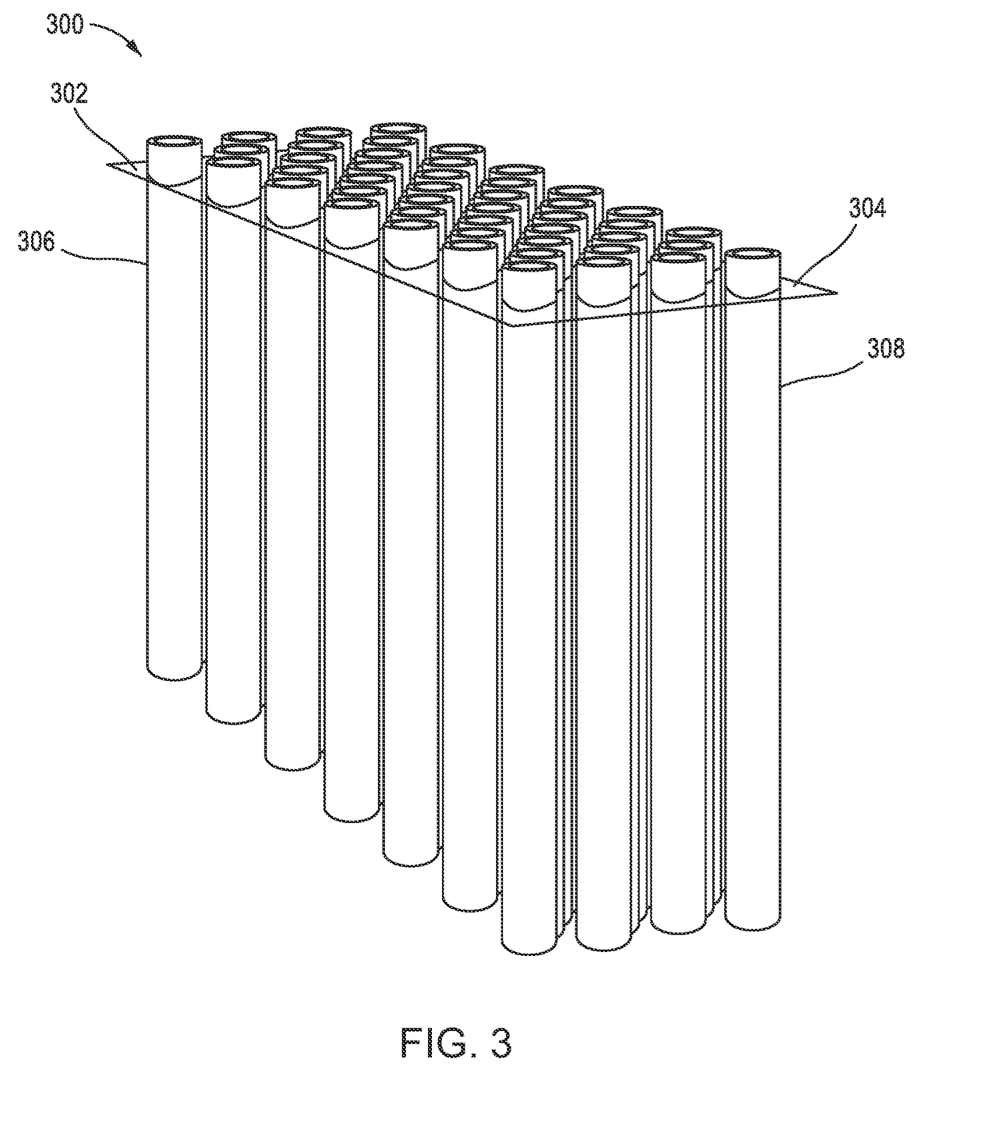
FIG. 3 illustrates a side perspective view of a microtube array according to an embodiment.

FIG. 3 illustrates a side perspective view of a microtube array 300 according to an embodiment. The microtube array 300 can include microtubes forming microtube arrays similar to the microtube array 103 of FIG. 1 and/or the microtube array 201 of FIG. 2. The microtube array 300 can be secured with a base plate 302, and can have a plurality of rows and columns of microtubes including microtubes 306 and 308.

Advantageously, 3D printing allows for superior compact manufacturing of microtube arrays by creating an integrated seal. The integrated seal allows for the creation of an AM microtube array 300 having less mass than one created by traditional brazing techniques. This in turn can allow for improved heat exchanger effectiveness $E_{ff}$ and improved surface transfer area.

Figure 4A:
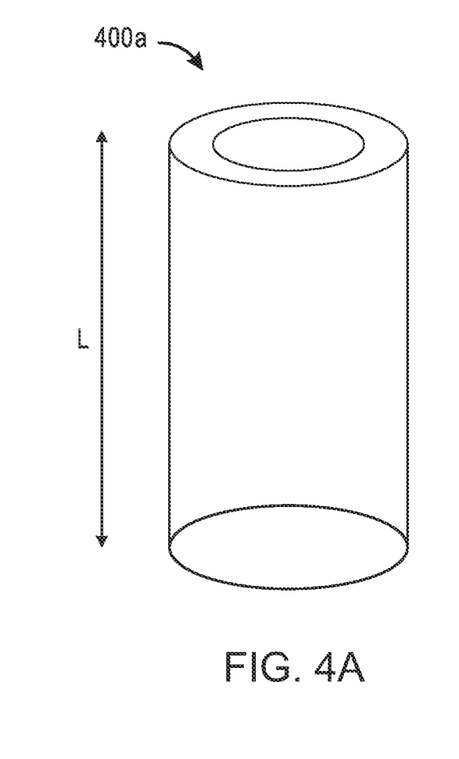
FIG. 4A illustrates a side perspective view of a microtube according to an embodiment.

FIG. 4A illustrates a side perspective view of a microtube 400a according to an embodiment. The side perspective view shows the design parameter length L for modeling purposes. By modeling the microtube 400a, a microtube array can be analyzed prior to 3D printing.

Figure 4B:
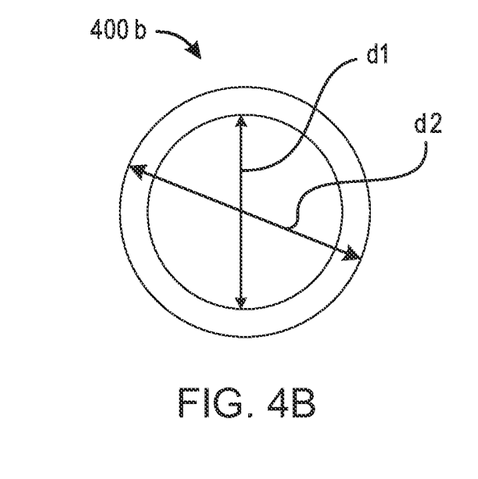
FIG. 4B illustrates a cross-section view of the microtube.

FIG. 4B illustrates a cross-section view of a microtube 400b. The microtube 400b shows a diameter d1 and a diameter d2 of an annulus 403 formed due to the thickness of the microtube. As shown in FIG. 4B, the diameter d2 of the annulus is larger than the diameter d1. Both the diameter d1 and the diameter d2 can be designed and additively manufactured to allow for improved heat exchanger effectiveness $E_{ff}$. For instance, in some embodiments diameter d1 can be less than or equal to 1 mm, diameter d2 can be less than or equal to 1 mm, and/or both diameters d1 and d2 can be less than or equal to 1 mm in microtube 400b. In some embodiments a tube length L to diameter (d1 or d2) ratio can be between three-hundred to one to one-thousand to one.

As described above, heat exchanger effectiveness $E_{ff}$ can be a figure of merit for analyzing and designing a microtube heat exchanger. Effectiveness $E_{ff}$, which is the generally accepted figure of merit for a heat exchanger, can also be defined as the fraction of minimum temperature difference of fluid outlet over fluid inlet.

In a two fluid heat exchanger such as a gas and liquid system where the liquid flows through a microtube array (hot fluid) exchanging heat to the gas (the cold fluid), a simplified analysis based on concepts of energy balance give Equation 1, below. Equation 1 relates the heat transfer effectiveness $E_{ff}$ in terms of temperatures of the hot and cold fluids measured at heat exchanger inlet/outlet ports. In Equation 1 the port temperatures are as follows: $T_{cold,out}$, the temperature of the cold fluid flowing out of the cold fluid outlet (port), $T_{cold,in}$, the temperature of the cold fluid flowing into the cold fluid input inlet (port), $T_{hot,out}$, the temperature of the hot fluid flowing out of the hot fluid outlet (port), and $T_{hot,in}$, the temperature of the hot fluid flowing into the hot fluid input inlet (port). As expressed in Equation 1, the heat transfer effectiveness $E_{ff}$ is a dimensionless figure of merit, and temperature can have dimensions of degrees (deg. C.).

$$E_{ff} = \frac{T_{cold,out} - T_{cold,in}}{T_{hot,in} - T_{cold,in}} \qquad \text{Eq. 1}$$

In addition to Equation 1, a graphical procedure may be required to analyze a heat exchanger as a function of additional parameters including, but not limited to, the microtube length L as shown in FIG. 4A and the total number of microtubes (tubes).

Figure 5:
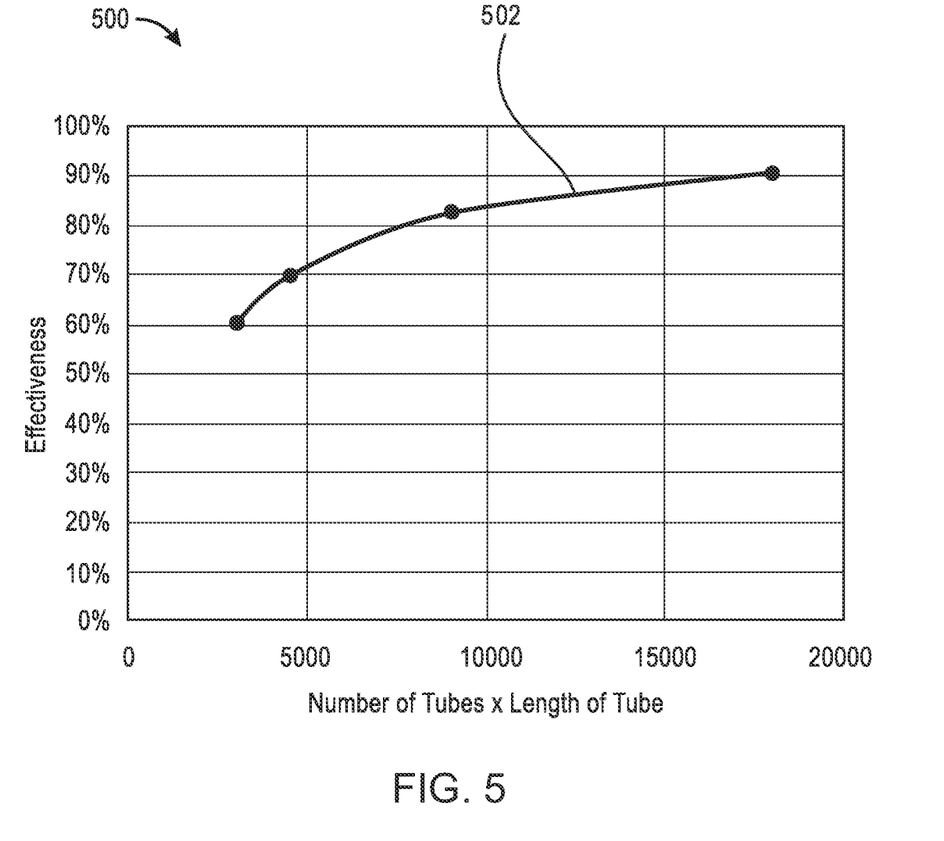
FIG. 5 is a plot of microtube heat exchanger effectiveness $E_{\!f\!f}$ as a function of tube length times number of tubes.

FIG. 5 is a plot 500 of microtube heat effectiveness $E_{ff}$ as a function of tube length times number of tubes. In FIG. 5 the number of tubes can be the number of microtubes, and the tube length can be the microtube length L as shown in FIG. 4A. As shown in FIG. 5, heat exchanger effectiveness $E_{ff}$ scales with the product of number of fluid passages (microtubes) and their length (L) based on an engineering assumption that the fluids are exposed to each other across the fluid passage walls. This scaling can be a nonlinear function as effectiveness approaches one-hundred percent where the heat transfer is driven by temperature differentials. As shown in FIG. 5, this leads to the effectiveness trace 502 demanding an exponentially growing mass.

A high performance heat exchanger design can be achieved through 3D printing by preferentially transferring heat between hot and cold fluids using a reduced length scale. Because additive manufacturing can avail various geometries at a length scale of approximately 100 microns (0.1 mm), very high performance heat exchanger designs can be possible. This in turn can lead to heat exchanger surface area densities of up to the supreme value 20,000 $m^2/m^3$. Coincident with improved compactness is reduced mass which can avail performance heat capacity values of up to 10 Watts per kilogram per degree C.

Figure 6:
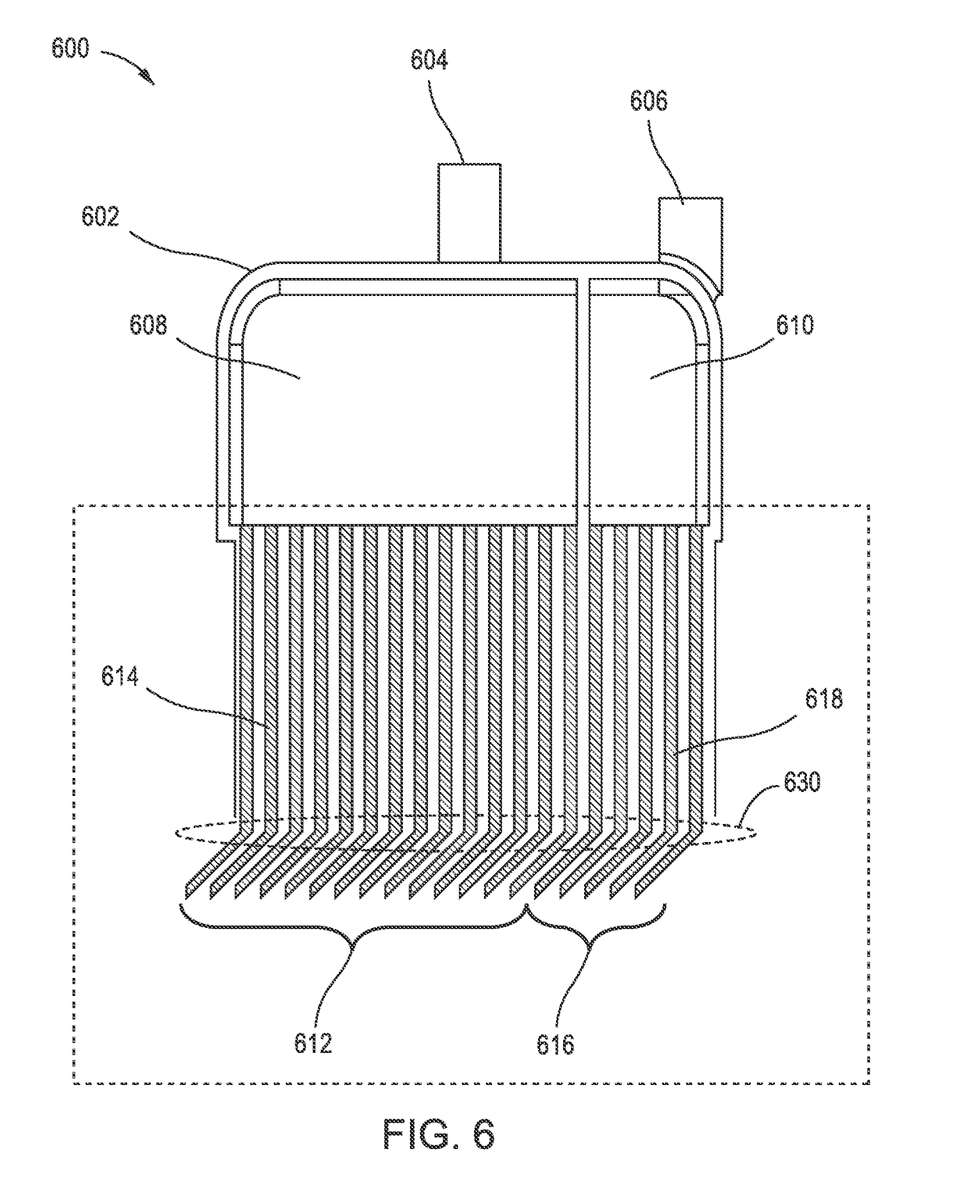
FIG. 6 a side view of an additively manufactured microtube heat exchanger according to another embodiment.

FIG. 6 is a side view of an additively manufactured (AM) microtube heat exchanger 600 according to an embodiment. The AM microtube heat exchanger 600 is similar to the AM microtube heat exchanger 100 of FIG. 1, except the microtube array 603 includes microtubes which have a pleat (crease or bend) 630. Also, similar to the AM microtube heat exchanger 100 of FIG. 1, the AM microtube heat exchanger 600 includes a header 602 and a microtube array 603. The header 602 has a header section 608 and a header section 610.

Similar to the microtube array 103 of FIG. 1, the microtube array 603 has a plurality of microtubes separated into a first microtube array 612 and a second microtube array 616. Microtubes from the first microtube array 612 can carry a first liquid or fluid, and microtubes from the second microtube array 616 can carry a second liquid or fluid. For instance, microtubes including microtube 614 can carry a liquid such as oil, and microtubes including microtube 618 can carry a liquid such as a heating, ventilation and air conditioning (HVAC) refrigerant.

Although the embodiment of FIG. 6 shows the microtube array 603 as having a pleat 630, other construction types are possible. For instance, the microtube array 603 can include bends, additional pleats, also referred to as "zig-zags", and curves which are not availed by traditional brazing processes.

Three-dimensional (3D) printing can advantageously avail the construction of a fluid-tight geometry. Fluid-tight arrays can be constructed in a non-planar arrangement. In some embodiments, fluid to air heat exchangers (alternatively called radiators) can be configured with radiators placed normal to flow. In other embodiments, a frontal area exposed to the flow can be negative to improve a transport vehicles performance. For instance, the use of zig-zags can be used to reduce an aerodynamic drag and thereby improve performance of a vehicle.

Figure 7:
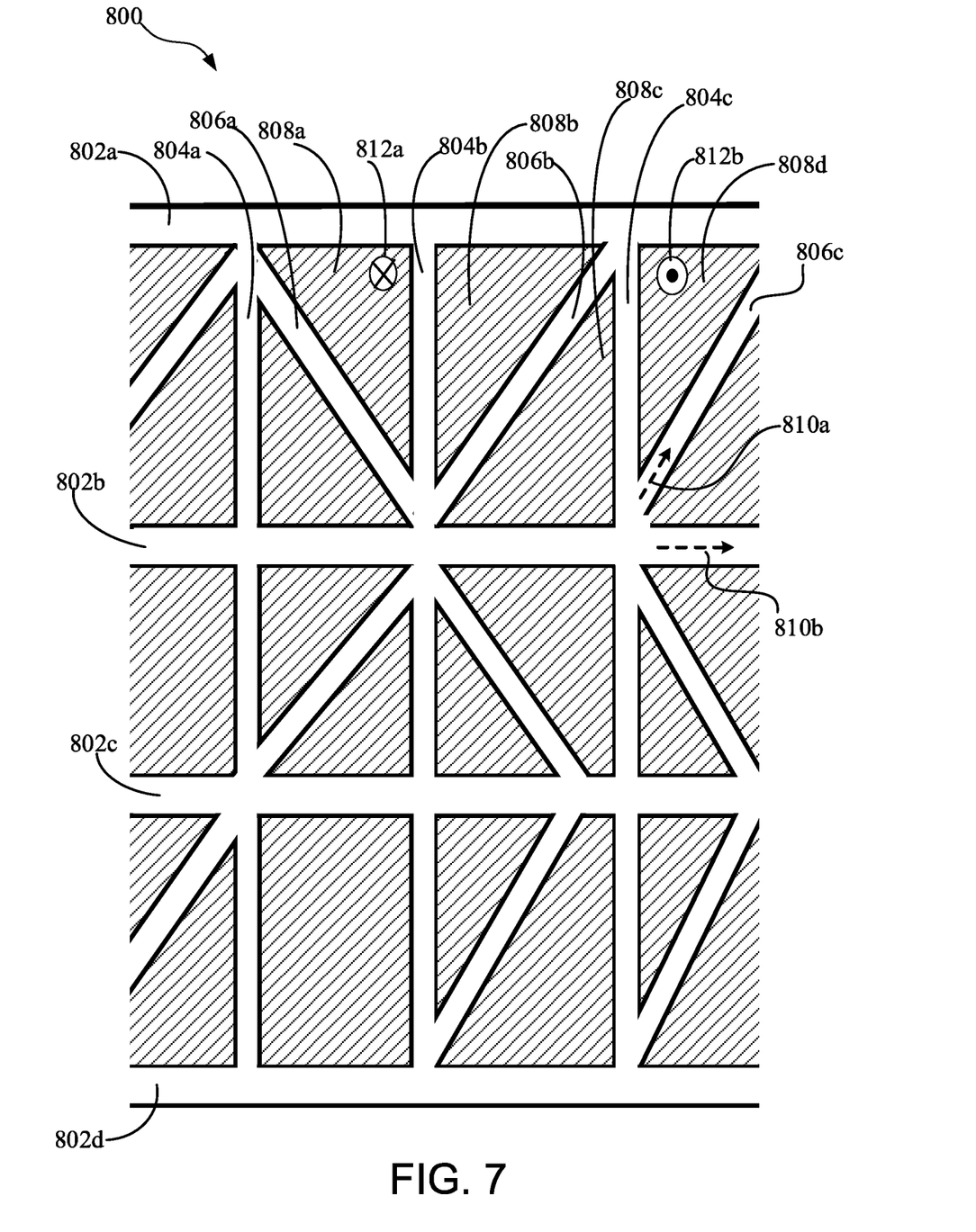
FIG. 7 illustrates a cross-sectional side view of an additively manufactured microtube lattice array according to an embodiment.

FIG. 7 illustrates a cross-sectional side view of an additively manufactured (AM) microtube lattice array 800 according to an embodiment. The AM microtube lattice array 800 can be a lattice of microtubes additively manufactured to fit within a hollow support structure of a vehicle; and unlike the microtube array 300 of FIG. 3, the AM microtube lattice array 800 can be additively manufactured to have a lattice structure capable of providing mechanical support and functioning as a heat exchanger. As shown by the cross-sectional view in FIG. 7, the AM microtube lattice array 800 includes microtubes 802a-d oriented in a first direction and microtubes 804a-c oriented in a second direction, perpendicular to the first direction. Additionally, the microtube lattice array 800 includes diagonal segments including microtube segments 806a-c.

Also, as shown by the shaded regions in FIG. 7, the AM microtube lattice array 800 has interstitial regions forming interstitial paths or conduits between microtubes and microtube segments. For instance, an interstitial path 808a is formed between the microtube 802a, the microtube 804b, and the microtube segment 806a. Similarly an interstitial path 808b is formed between the microtube 802a, the microtube 804b, and the microtube segment 806b; and an interstitial path 808c is formed between the microtube 802b, the microtube 804c, and the microtube segment 806b.

The microtubes 802a-d, 804a-c, and microtube segments 806a-c can advantageously provide mechanical lattice support to an interior, hollow structure of a transport vehicle while simultaneously functioning as microtubes to carry and circulate a first fluid. The first fluid can be a fluid such as engine oil. The flow direction of the first fluid flow can be along a microtube axis. For instance as shown in FIG. 7, within the microtube segment 806c the first fluid may flow in a direction parallel (or opposite) to flow vector 810a. Similarly, within microtube 802b the first fluid may flow in a direction parallel (or opposite) to the flow vector 810b.

The first fluid can exchange heat with a second fluid flowing in the interstitial paths. The flow direction of the second fluid can be along a direction perpendicular to the cross-sectional side view of FIG. 7. For instance, in interstitial path 808a the second fluid may flow in a direction into the page as represented by arrow tail vector 812a; similarly, in interstitial path 808d the second fluid may flow in a direction out of the page as represented by arrow tip vector 812b. An example of a second fluid is engine coolant (antifreeze) or forced air.

The microtubes and interstitial paths of the AM microtube lattice array 800 can be sealed such that the first fluid and the second fluid do not mix. Heat can be exchanged between the first fluid and the second fluid via the microtubes. The microtubes can be additively manufactured to advantageously provide a high surface area density and to achieve high values of heat transfer effectiveness $E_{ff}$. Additionally, although the embodiment shows one embodiment of an AM microtube lattice array, other embodiments having fewer or greater microtubes, microtube segments, and interstitial paths are possible. Additionally, a transport vehicle can advantageously have one or more support structures additively manufactured with AM microtube lattice arrays, thereby availing a large number of microtubes and transfer surface area for heat exchange.

Figure 8:
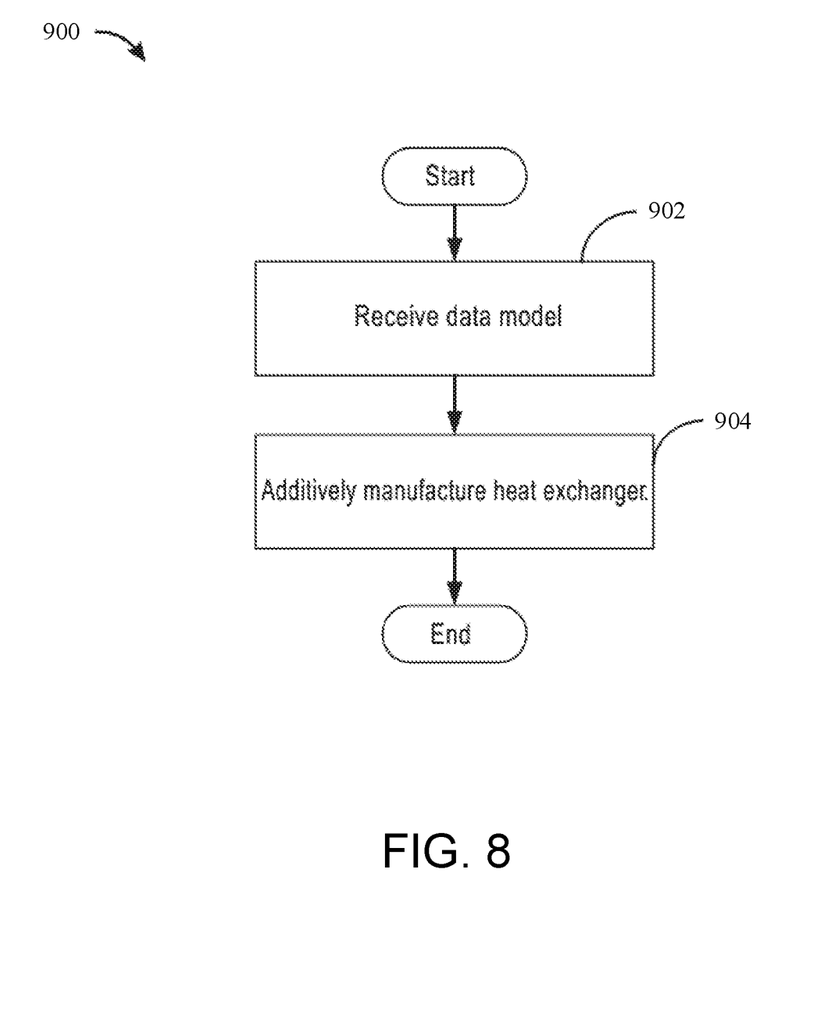
FIG. 8 conceptually illustrates a process for additively manufacturing a heat exchanger according to an embodiment.

FIG. 8 conceptually illustrates a process 900 for additively manufacturing a heat exchanger according to an embodiment. In step 902 a model can be received by an entity such as a 3D printer for the design and manufacture of an AM microtube heat exchanger. The model can be based on embodiments discussed above, and derivations of the model can be accomplished by analyzing and solving equations relating to microtube heat exchangers having microtube arrays. In some embodiments a software program can be used to solve differential equations describing fluid flow in a certain design configuration. In step 904 an additive manufacturing process can be used to realize and manufacture the heat exchanger modeled in step 902. The additive manufacturing process can advantageously integrate a header and microtube array in a low mass compact structure.

The previous description is provided to enable any person skilled in the art to practice the various aspects described herein. Applications of additively manufactured microtube heat exchangers can include heat transfer in transport vehicles such as automobiles. By using additive manufacturing techniques, microtubes can be pleated and/or curved to compactly fit within hollow structures of a car. Various modifications to these exemplary embodiments presented throughout this disclosure will be readily apparent to those skilled in the art, and the concepts disclosed herein may be applied to other techniques for additively manufacturing heat exchangers, compact heat exchangers, and/or microtube heat exchangers.

Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An additively manufactured heat exchanger, comprising:
    a microtube array comprising a plurality of microtubes forming a substantially parallel array and extending from a base plate, the plurality of microtubes comprising a first plurality of microtubes and a second plurality of microtubes;
    a header comprising a plurality of header sections, the plurality of header sections comprising:
        a first header section integrated with the first plurality of microtubes at the base plate and configured to direct a first fluid through the first plurality of microtubes so as to exchange heat with an external fluid; and
        a second header section integrated with the second plurality of microtubes at the base plate and configured to direct a second fluid through the second plurality of microtubes so as to exchange heat with the external fluid, and
    a fin disposed between each adjacent microtube in at least one column of microtubes, the fin further being disposed perpendicular to and starting from the base plate to a surface of the microtubes;
    wherein the microtube array, the base plate, the fin, and the header are three-dimensionally (3-D) printed together to form a continuous body.

2. The heat exchanger of claim 1, wherein the microtube array has a non-planar configuration relative to a plane normal to the base plate.

3. The heat exchanger of claim 1, wherein the external fluid comprises a gas.

4. The heat exchanger of claim 1, wherein a diameter of each of the plurality of microtubes is equal to or less than 2 millimeters (mm).

5. The heat exchanger of claim 1, wherein the external fluid flows substantially orthogonal to a flow direction of the first and second fluids.

6. The heat exchanger of claim 1, wherein the header comprises a top surface at the base plate or a section thereof, and at least one surface coupled longitudinally to the top surface at an angle relative to the top surface.

7. The heat exchanger of claim 1, wherein at least one of the plurality of microtubes is curved.

8. The heat exchanger of claim 1, wherein at least one of the plurality of microtubes is pleated.

9. The heat exchanger of claim 1, wherein the header comprises a channel having a cross-sectional surface.

10. The heat exchanger of claim 9, wherein the cross-sectional surface is substantially triangular.

11. The heat exchanger of claim 9, wherein the channel is substantially orthogonal to the microtube array.

12. The heat exchanger of claim 9, wherein the header comprises a first surface substantially parallel to the base plate, a second surface coupled longitudinally to the first surface at a first angle, and a third surface coupled longitudinally to the second surface at a second angle, the first, second, and third surfaces defining the channel.

13. The heat exchanger of claim 1, wherein the microtube array has a non-planar configuration relative to a plane normal to first fluid flow.

14. The heat exchanger of claim 13, wherein the non-planar configuration of the microtube array comprises a curved configuration.

15. The heat exchanger of claim 13, wherein the non-planar configuration of the microtube array comprises a pleated configuration.

16. The heat exchanger of claim 1, wherein the fin is configured to provide structural support to the column of microtubes.

17. The heat exchanger of claim 16, further comprising a fin disposed between each adjacent microtube in at least one row of microtubes in the array.

18. The heat exchanger of claim 1, wherein
    the heat exchanger is additively manufactured at an angle relative to the base plate; and
    the at least one fin configured to provide the microtube array with structural support.

19. An additively manufactured compact heat exchanger, comprising:
    a base plate;
    a first plurality of microtubes forming an array, the first plurality of microtubes substantially parallel and extending from the base plate;
    a first header section, the first header section integrated with the first plurality of microtubes at the base plate and configured to direct a first fluid through the first plurality of microtubes so as to exchange heat with an external fluid, and a fin disposed between each adjacent microtube in at least one column of the array, the fin further being disposed perpendicular to and starting from the base plate to a surface of the first plurality of microtubes;

wherein the microtube array, the base plate, the fin, and the first header section are three-dimensionally printed together to form a continuous body.

20. The additively manufactured compact heat exchanger of claim 19, further comprising:

a second plurality of microtubes forming an array, the second plurality of microtubes substantially parallel and extending from the base plate; and a second header section, the second header section integrated with the second plurality of microtubes at the base plate and configured to direct a second fluid through the second plurality of microtubes so as to exchange heat with the external fluid.

21. The additively manufactured compact heat exchanger of claim 19, wherein at least one of the first plurality of microtubes is curved.

22. The additively manufactured compact heat exchanger of claim 19, wherein at least one of the first plurality of microtubes is pleated.

23. The additively manufactured compact heat exchanger of claim 19, wherein the external fluid comprises a gas.

24. A transport vehicle, comprising:

a three-dimensionally (3-D) printed support structure, the 3-D printed support structure comprising a 3-D printed microtube lattice array, a fin disposed between each adjacent microtube in at least one column of the 3-D printed microtube lattice array, the fin further being disposed perpendicular to and starting from the support structure to a surface of the 3-D printed microtube lattice array, the 3-D printed microtube lattice array configured to transfer heat between a first fluid and a second fluid, wherein the 3-D printed support structure is 3-D printed together to form a continuous body.

25. The transport vehicle of claim 24, the 3-D printed microtube lattice array comprising:

a plurality of microtubes configured to carry the first fluid; and a plurality of interstitial paths configured to a carry the second fluid.

26. The transport vehicle of claim 25, wherein heat is transferred from the first fluid to the second fluid.

27. The transport vehicle of claim 25, wherein heat is transferred from the second fluid to the first fluid.

28. The transport vehicle of claim 25, wherein the first fluid is a liquid.

29. The transport vehicle of claim 28, wherein the liquid is engine oil.

30. The transport vehicle of claim 25, wherein the second fluid is engine coolant.

31. The transport vehicle of claim 25, wherein the second fluid is a gas.

32. The transport vehicle of claim 31, wherein the gas is forced air.

33. A method of additively manufacturing a heat exchanger in a transport vehicle using three dimensional (3D) printing, the method comprising:

additively manufacturing a hollow support structure;

additively manufacturing a microtube lattice array within the hollow support structure, and additively manufacturing a fin disposed between each adjacent microtube in at least one column of the microtube lattice array, the fin further being disposed perpendicular to and starting from the hollow support structure to a surface of the microtube lattice array; and wherein the hollow support structure, the fin, and the microtube lattice array are additively manufactured together.

* * * * *